United States Patent [19]
Wilkie, II et al.

[11] Patent Number: 6,018,455
[45] Date of Patent: Jan. 25, 2000

[54] HEAT SINKS FOR CONDUCTORS IN LOW VOLTAGE SWITCHGEAR

[75] Inventors: William E. Wilkie, II; Rodney William Bruner, both of Fletcher, N.C.

[73] Assignee: Eaton Corporation, Cleveland, Ohio

[21] Appl. No.: 09/222,151

[22] Filed: Dec. 29, 1998

[51] Int. Cl.[7] .................................................. H02B 1/00
[52] U.S. Cl. ..................... 361/676; 361/704; 361/707; 361/831; 174/16.2; 174/16.3; 165/80.3
[58] Field of Search ..................... 361/676, 678, 361/704, 707, 709, 831; 174/16.1, 16.2, 16.3; 165/80.2, 80.3, 185

[56] References Cited

U.S. PATENT DOCUMENTS

| | | | |
|---|---|---|---|
| 3,536,960 | 10/1970 | Otteson et al. | 361/707 |
| 3,566,959 | 3/1971 | Koltuniak | 165/80.3 |
| 4,024,441 | 5/1977 | Coyle et al. | 361/624 |
| 4,121,276 | 10/1978 | Kovatch et al. | 361/614 |
| 4,366,528 | 12/1982 | Cole | 361/831 |
| 4,822,951 | 4/1989 | Wilson et al. | 174/68.2 |
| 5,598,322 | 1/1997 | Von Arx et al. | 361/704 |
| 5,753,875 | 5/1998 | Benke et al. | 218/118 |

*Primary Examiner*—Leo P. Picard
*Assistant Examiner*—Boris L. Chervinsky
*Attorney, Agent, or Firm*—Martin J. Moran

[57] ABSTRACT

Heat sinks extending rearward from and connected to the risers of a switchgear assembly by the same fasteners which secure the stabs to the risers dissipate the joule heat generated by current flow through the risers and stabs and accommodate for the higher temperature rise permitted in the power circuit breakers engaged by the stabs. The heat sinks are formed by a pair of heat sink members straddling the risers, each of which has an elongated flat body with an extended flat mounting surface on a first face which provides extended surface engagement with a stab. The elongated body projects rearward beyond the stab and a first set of transverse fins project from the first face rearward of the stab toward the first set of fins on the other heat sink member of the pair. A second or additional set of fins project laterally outward from a second face opposite the first face of the elongated body and are dimensioned to maintain appropriate through-air clearance with the additional fins on the heat sinks on an adjacent riser.

8 Claims, 4 Drawing Sheets

HEAT SINKS FOR CONDUCTORS IN LOW VOLTAGE SWITCHGEAR

CROSS REFERENCES TO RELATED APPLICATIONS

This application is related to commonly owned, Patent Applications: Ser. No. 09/188,721, entitled "SWITCHGEAR RISER CONSTRUCTION AND MOUNTING", and filed on Nov. 9, 1998; and Ser. No. 09/188,470, entitled "SWITCHGEAR CONDUCTORS AND MOUNTING ARRANGEMENTS THEREFORE", and filed on Nov. 9, 1998

BACKGROUND OF THE INVENTION

1. Field of the Invention

This invention relates to switchgear for electric power distribution systems, and more particularly, to heat sinks for electrical conductors in low voltage switchgear.

2. Background Information

Switchgear includes metal cabinets housing electrical apparatus and associated conductors for connecting the electrical apparatus in an electric power distribution system. The electrical apparatus can include electrical switches such as circuit breakers and network protectors which provide protection, disconnect switches for isolating parts of the electric power distribution system and transfer switches for transferring between alternate power sources. The electrical apparatus can also include metering equipment. Switchgear operating at voltages up through 600 volts are categorized as low voltage switchgear.

Typically, the electrical apparatus such as a plurality of circuit breakers is vertically stacked in a forward compartment of the switchgear cabinet. Multi-phase input and output buses must be connected to each circuit breaker. Typically these buses include a cross bus of rigid phase conductors extending transversely through the cabinet in a middle compartment behind the circuit breakers. This cross bus is connected to a vertical bus formed by phase conductors referred to as risers. The risers are connected to each circuit breaker by forwardly extending stab conductors which are connected to the circuit breaker through quick disconnects as the circuit breaker is inserted into the cabinet. The other sides of feeder circuit breakers are connected through another set of quick disconnects to runbacks which extend rearward between the risers into a rear compartment where they are connected to a cable bus system. The cable bus system and the cross bus connect the switchgear into the electric power distribution system.

These low voltage switchgear buses are designed for a range of current ratings which must meet mandated temperature rise limitations. The power circuit breakers used in such switchgear are subject to a different set of temperature rise limitations. It turns out that the temperature rise limits for the circuit breakers at the interface point between the circuit breaker disconnects and the stab conductors of the bus assemblies are about 20 degrees higher than the temperature rise limits for the buses. This temperature rise differential has been accommodated for traditionally by sizing the riser bus to adequately offset this differential along with the temperature rise effects incurred due to the bus resistance. Typically, this has been accomplished by increasing the cross-sectional area of the vertical bus appropriately.

Generally speaking, the heat contribution by power circuit breakers to the switchgear vertical bus is more severe at the higher continuous current ratings. In the past, circuit breaker frames in the lower current ratings were housed in one common size package while the frames of higher current ratings were housed in a second, larger common size package. Power circuit breakers throughout the range of current ratings provided by the assignee of this invention are housed in a single size package. This smaller package coupled with the fact that the housing is of insulated case construction which offers little to no free conductive cooling of the breaker current path internal to the housing, rather than the conventional sheet metal construction, aggravates the temperature rise problem in the risers. The common prior solution of increasing the cross-sectional area of the risers is not attractive economically due to the amount of copper required to satisfy the temperature rise requirements.

There is a need, therefore, for improved switchgear which accommodates for the higher temperatures generated by the circuit breakers and especially those with a molded case.

SUMMARY OF THE INVENTION

The present invention is directed to a switchgear assembly which includes at least one electrical apparatus mounted in a cabinet, electrical conductors including a set of risers extending vertically in the cabinet and a set of stab conductors secured to the risers and engaging the electrical apparatus for electrically connecting the electrical apparatus to the risers, and heat sinks connected to the electrical conductors for dissipating heat generated by current flowing through the electrical conductors and heat injected into the electrical conductors from the electrical apparatus. Where the risers are mounted in the cabinet behind the electrical apparatus and the stab conductors extend forward from the risers to engage the electrical apparatus, the heat sinks extend rearward from the electrical conductors. Preferably, the heat sinks are connected to the electrical conductor by common fasteners which also secure the stab conductors to the electrical conductors.

Where the stab conductors comprise a pair of flat conductors straddling the width of the risers, the heat sinks comprise a pair of heat sink members in extended contact with and extending rearward from the flat conductors. Preferably, the heat sink members have, rearward of the flat conductors, fins extending inward toward each other across the width of the risers. Most preferably, the pair of heat sink members have additional fins extending laterally outward. Where the risers are mounted side-by-side with a selected spacing between, the additional fins extend laterally outward toward the additional fins on a heat sink member on an adjacent riser no more than a distance which maintains a predetermined through-air clearance between the additional fins on the heat sink members connected to adjacent risers. Where the risers comprise confronting spaced apart channel members, the flat conductors forming the stab conductors and the heat sink members both bridge the spaced channel members. Preferably, the heat sink members have a height corresponding to the height of the stab conductors.

The invention is also directed to the heat sinks used in combination with the switchgear assembly as described.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
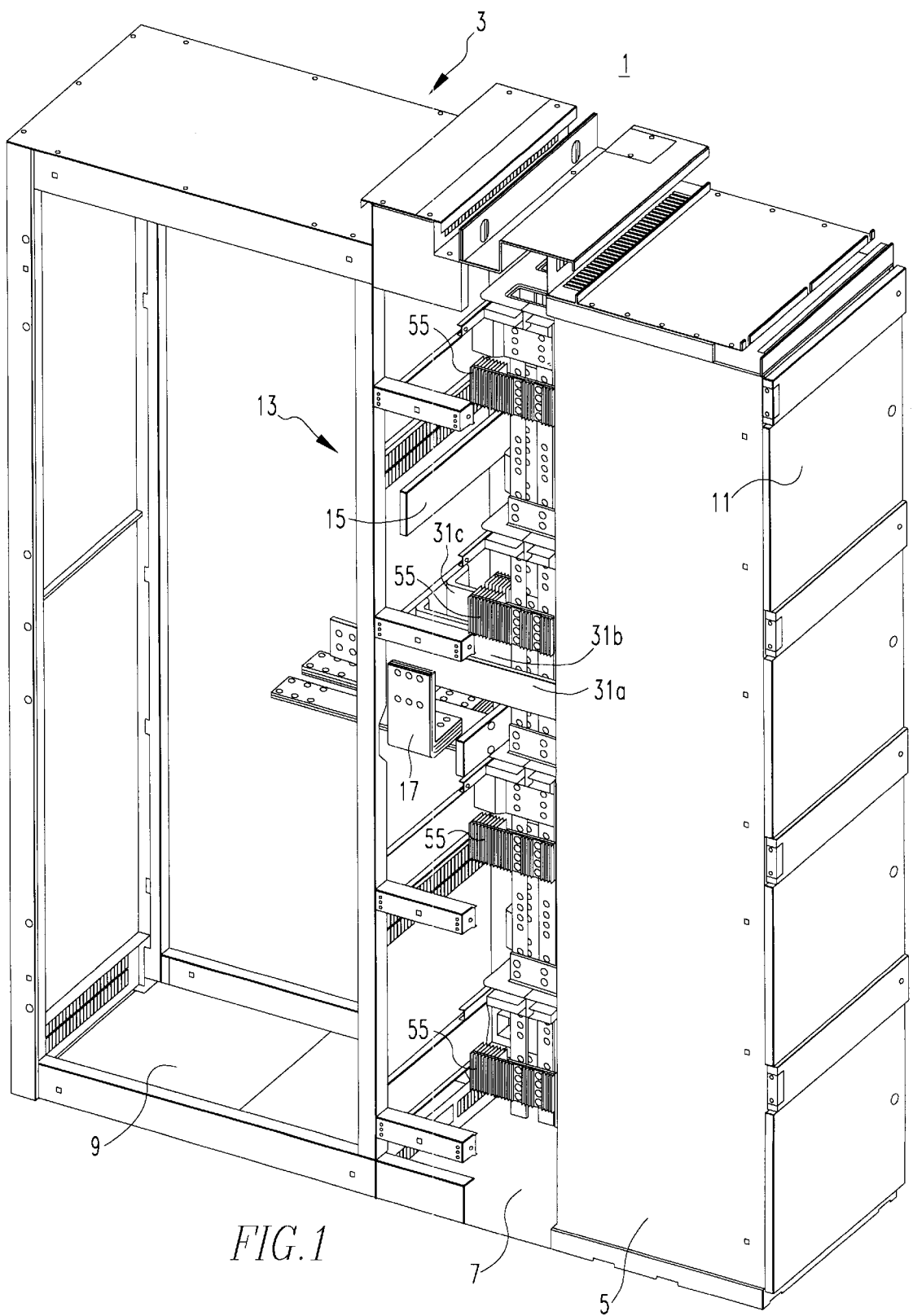
FIG. 1 is an isometric view of a switchgear assembly incorporating the invention.

FIG. 1 illustrates a switchgear assembly incorporating the invention which includes a metal cabinet 3 having a front compartment 5, a middle compartment 7 and a rear compartment 9. The front compartment 5 has a plurality of vertically stacked cells each having a front door 11. Each cell can contain electrical apparatus such as, for instance, a circuit breaker. The middle compartment 7 houses the main cross bus 13 which includes phase conductors 15 (only one shown in FIG. 1) and a neutral conductor 17. The rear compartment 9 houses cabling (not shown). This cabling and the main cross bus 13 connect the switchgear assembly 1 into an electrical power distribution system (not shown).

Figure 2:
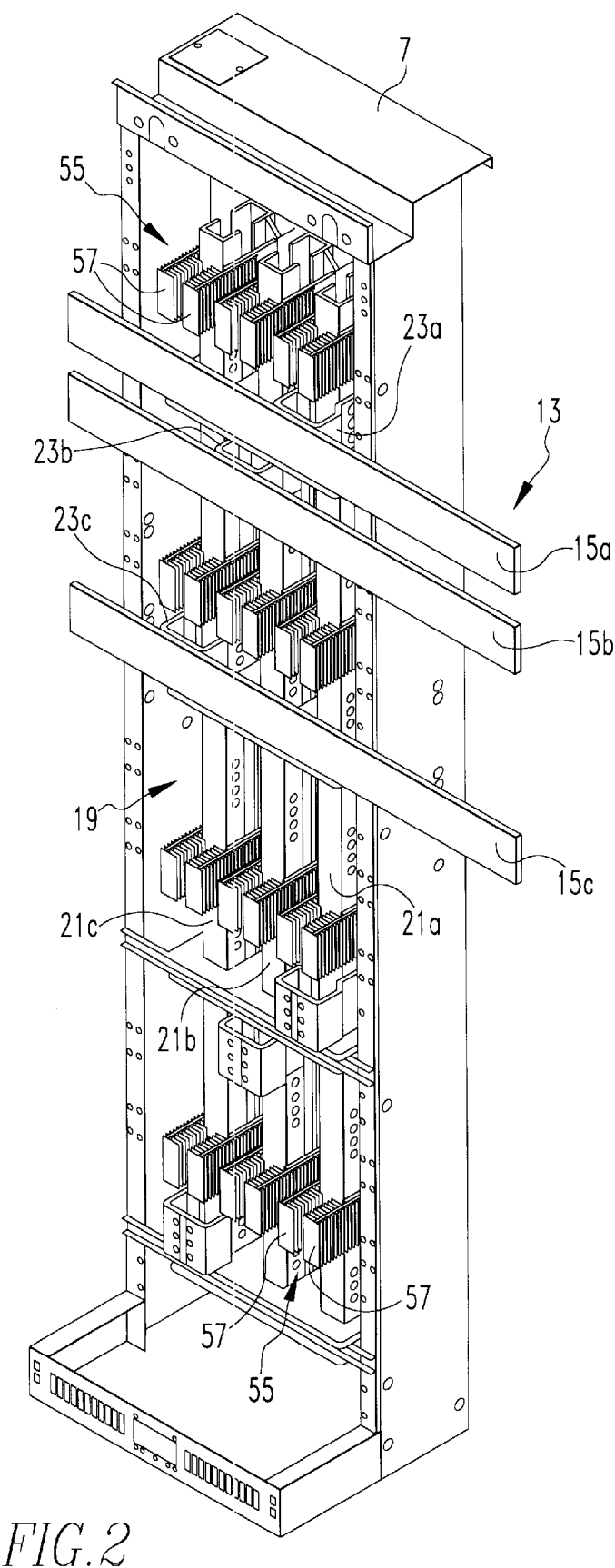
FIG. 2 is an isometric rear view of the middle section of the switchgear compartment of FIG. 1 with some parts removed.

FIG. 2 illustrates in more detail the arrangement of buses within the middle compartment 7. The main cross bus 13 includes vertically spaced, horizontally extending phase conductors 15a, 15b and 15c. Also housed in the middle compartment 7 is a vertical bus 19 which includes a set of conductors in the form of risers 21a, 21b and 21c connected to the associated phase conductor 15 of the main cross bus 13 by main bus taps 23a, 23b, and 23c.

Figure 3:
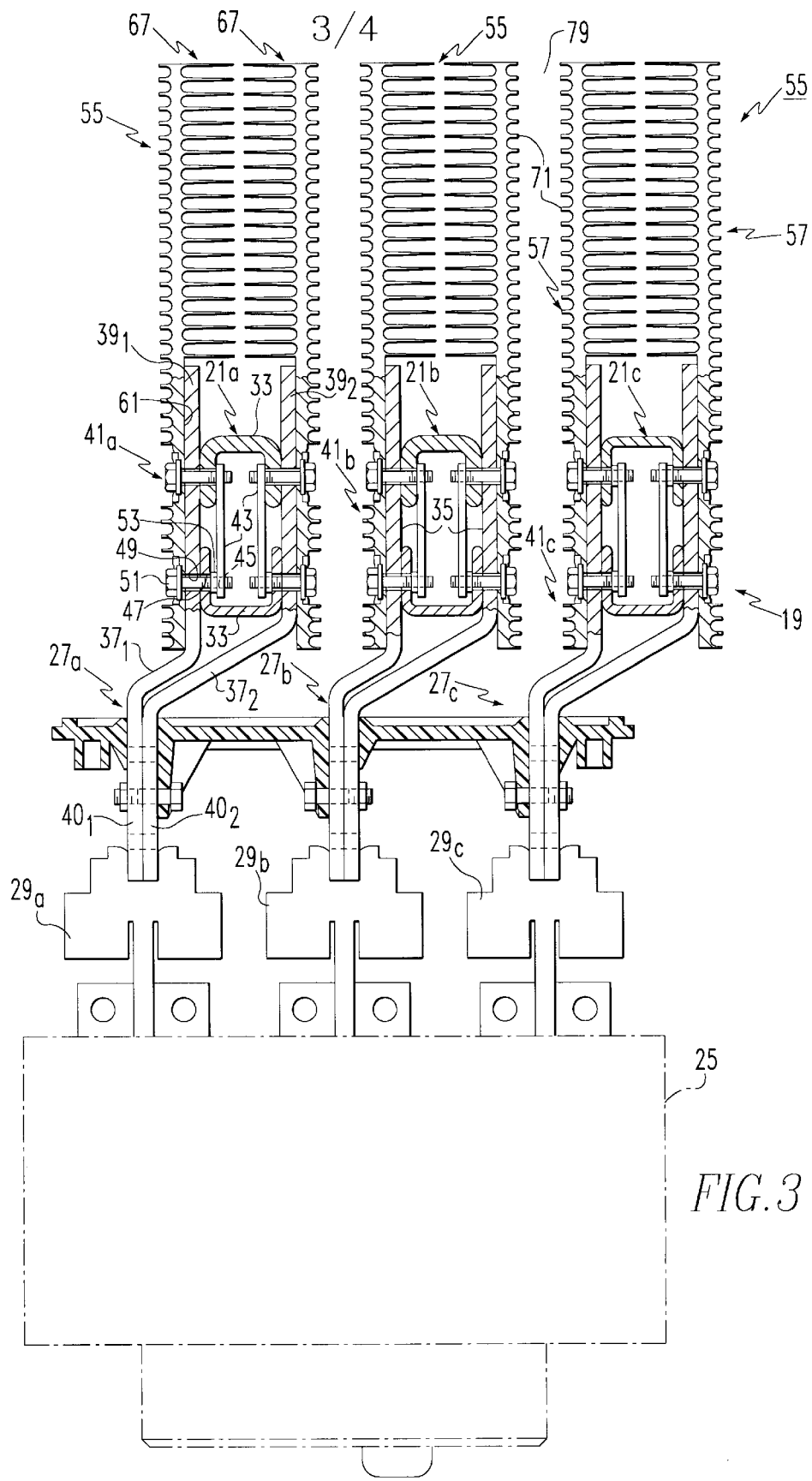
FIG. 3 is a horizontal sectional view through the bus bars in the middle compartment of the switchgear assembly generally at a level just above the stab conductors.

As mentioned, the front compartment 5 of the switchgear cabinet 3 contains electrical apparatus stacked vertically. This electrical apparatus, such as circuit breakers, must be connected to the bus systems. Thus, as shown in FIG. 3, the electrical apparatus 25 is connected to the conductors of the vertical bus 19 by stab conductors 27a, 27b and 27c through quick disconnects 29a, 29b and 29c. The electrical apparatus 25 is also connected to runback conductors which extend rearward between the risers 21. For clarity, only one set of such runbacks 31a–31c is illustrated in FIG. 1. The runbacks 31a–31c extend into the rear compartment 9 where they are connected to the cabling (not shown).

Each of the risers 21 is a hollow conductor which is a more efficient conductor of ac current than the conventional solid, flat conductor, because the bulk of the conductive material is massed at the periphery of the conductor where the current is concentrated as a result of the skin effect. The hollow conductors 21 are formed by a pair of confronting electrically conductive U-channels 33. The pairs of U-channels are mounted in spaced confronting relation with the legs of the two U-channels of each pair extending toward each other. Preferably, the confronting channels 33 are spaced from each other by a gap 35. This allows convective circulation of cooling air through the hollow risers 21 thereby lowering the temperature rise for a given ampere rating.

The paired U-channels 33 of each of the risers 21 are fixed in spaced relation by supports in the form of the main bus taps 23a–23c (see FIG. 2) and the stab conductors 27a–27c (FIG. 3). The stab conductors 27a–27c each comprise a pair of flat conductor elements $37_1$ and $37_2$. The stab elements 37 have flat sections $39_1$ and $39_2$ straddling the pair of U-channels 33 of the associated riser 21, and terminal sections $41_1$ and $41_2$ extending generally laterally from the U-channels 33 and joined together to engage the associated quick disconnect 29. The flat sections $39_1$ and $39_2$ of the stab conductors 27 are secured to the associated pair of U-channels 33 by connections 41a–41c. These connections 41a–41c include backing plates 43 having two sets of apertures 45 aligned with apertures 47 in the legs of the risers 21 and apertures 49 through the flat sections 39 of the stab conductor elements 37. These connections 41 further include bolts 51 which extend through the apertures 49 and 47 and engage the tapped apertures 45 in the backing plates. Alternatively, individual nuts could be used in place of the backing plates; however, the arrangement shown makes it easier to assemble the connections 41.

The low voltage switchgear (up through 600 volts), for which this invention is particularly suitable, is typically provided with a range of current ratings, such as, for example, 2,000, 3,200, 4,000 and 5,000 amperes. The risers 21 must provide the appropriate cross-section to meet temperature limitations for each of the current ratings. The hollow conductor arrangement is particularly suitable for making this accommodation. In particular, the thickness of the sheet material which is roll formed into the U-channels 33 is selected to provide the appropriate conductor cross-section. In order to standardize supports and other dimensions within the switchgear, all the U-channels 33 are formed with a common width between the outer surfaces of the legs. With this dimension of the U-channels fixed, it is possible to use different thicknesses of the two U-channels 33 in a confronting pair to accommodate a particular current rating. In order to make a solid connection between the risers and the stab conductors 27, the backing plates 43 are configured to accommodate for this variation in thickness of the U-channel legs. Thus, one end of the backing plates 53 has projections 53 on one face which accommodate for unequal thicknesses of confronting U-channels. When U-channels of the same thickness are used, the backing plate 53 is turned over so that a flat side of the backing plate bears against both U-channels.

Figure 4:
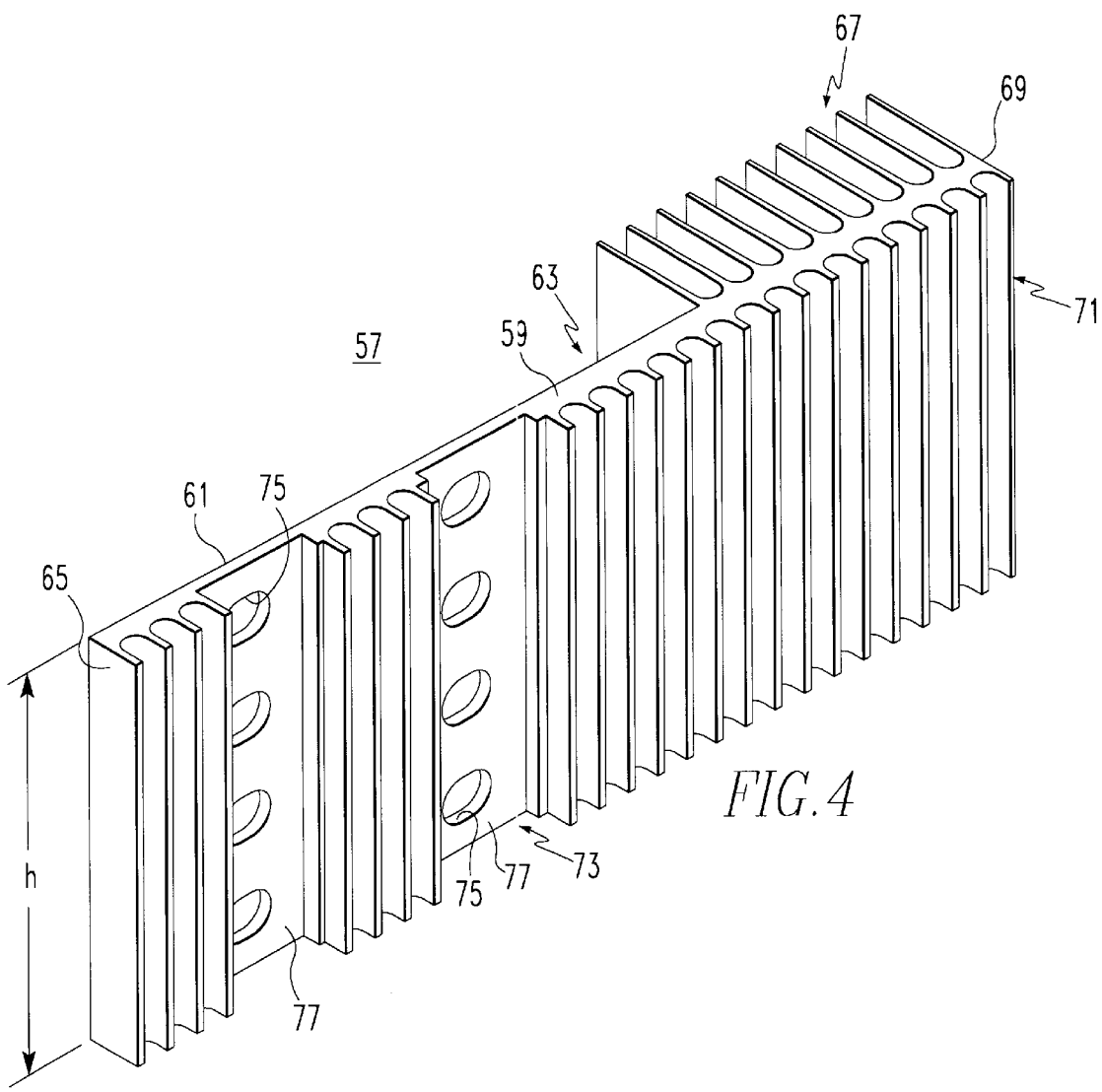
FIG. 4 is an isometric view of a heat sink member which forms part of the invention.

As mentioned, the electrical apparatus 25 connected to the stab conductors 27 can have a higher temperature limitation than the conductors of the risers. While the thickness of the U-channels forming the risers could be further increased to accommodate for this temperature rise, the invention provides for heat sinks 55 which dissipate the additional heat. The heat sinks 55 each include a pair of heat sink members 57. As best seen in FIG. 4, each heat sink member 57 has an elongated flat body 59 with an extended flat mounting surface 61 on a first face 63 adjacent a first end 65 of the elongated body 59. A first set of fins 67 project outwardly from the first face 63 of the elongated body 59 adjacent a second end 69. This first set of fins 67 extend transversely to the longitudinal axis of the elongated body 59. An additional or second set of transversely extending fins 71 project outwardly from a second face 73 opposite the first face 63 of the elongated body. Mounting apertures 75 extend through the elongated body 59 from the mounting surface 61 to flat sections 77 and the second face 73.

The heat sink members 57 are mounted by the bolts 51 connecting the stab elements 37 to the U-channels 33 so that these connections 41 become common connections for the electrical conductors and the heat sinks 55. The heat sink members are mounted with the mounting surface 61 in extended contact with the flat sections 39 of the stab elements 37 for maximum heat transfer. To this end, the flat mounting surfaces 61 have a height, h, which is substantially coextensive with the height of the flat sections 39 of the stab elements.

As can be seen in FIG. 3, the pair of heat sink elements 57 forming a heat sink 55 straddle the stab elements 37 and the confronting U-channels 33 forming the conductors of the risers 21 and extend rearward within the switchgear cabinet.

The first set of fins then project toward each other with a small gap 79 between them. The additional or second set of fins 71 then project laterally outward toward the corresponding additional fins on the heat sink member 57 of an adjacent riser. The length of these additional fins 71 is selected so as to maintain the appropriate through-air clearance between phases of the vertical bus.

As can be seen, the heat sinks 55 are provided at the connections 41 between the risers 21 and the stab conductors 27 which form part of the current paths between the vertical buses and the electrical apparatus. The heat sink members 57 utilize all the available area on the surface of the stab elements 37 to conduct heat away from the electrical joint connecting the stab conductors to the risers. The heat is then conducted to the finned areas of the heat sink members 57 where it is transferred to the ambient air via free convection. The finned areas of the heat sink members effectively lower the temperature rise for the connection 41 between the vertical bus and the stab conductors as well as the temperature rise at the quick disconnects 29. The heat sink members 57 create a multitude of surfaces to dissipate the heat that cannot be achieved practically by conventional bus bars. The heat sinks 55 of the invention provide a localized approach to dissipating thermal energy as opposed to a global upsizing of the risers 21 in the vertical bus.

Preferably, the heat sink elements 57 of the invention are extruded from aluminum.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. switchgear assembly comprising:

a cabinet;

at least one electrical apparatus mounted in said cabinet;

electrical conductors comprising a set of risers extending vertically in said cabinet and a set of stab conductors secured to said risers and engaging said electrical apparatus for electrical connection of said electrical apparatus to said risers;

and heat sinks connected to said electrical conductors for dissipating heat generated by current flowing through said electrical conductors;

said risers are mounted in said cabinet behind said electrical apparatus, said stab conductors extend forward from said risers to engage said electrical apparatus, and said heat sinks extend rearward from said electrical conductors;

said stab conductors are connected to said risers at connections and said heat sinks are connected to said electrical conductors at said connections;

said connections between said risers and said stab conductors comprise common fasteners which also secure said heat sinks to said electrical conductors.

2. The switchgear assembly of claim 1 wherein said heat sinks are made of aluminum.

3. The switchgear assembly of claim 1 wherein said risers have a given width, said stab conductors comprise a pair of flat conductors straddling the width of said risers, and said heat sinks comprise a pair of heat sink members in extended contact with and extending rearward from said flat conductors.

4. The switchgear assembly of claim 3 wherein said pair of heat sink members have rearward of said flat conductors fins extending inward toward each other.

5. The switchgear assembly of claim 4 wherein said pair of heat sink members have additional fins extending laterally outward.

6. The switchgear assembly of claim 5 wherein said risers comprise confronting but spaced apart channel members, said stab conductors and said heat sink members both bridging said spaced channel members.

7. The switchgear assembly of claim 6 wherein said risers are mounted side-by-side with a selected spacing between, said additional fins extend laterally outward toward said additional fins on a heat sink member on an adjacent riser no more than a distance which maintains a predetermined through-air clearance between said additional fins on said heat sink members connected to adjacent risers.

8. The switchgear assembly of claim 3 wherein said stab conductors have a certain height, and said heat sink members have about said certain height.

\* \* \* \* \*